United States Patent [19]

Saito et al.

[11] Patent Number: 5,539,876
[45] Date of Patent: * Jul. 23, 1996

[54] COMPUTER UNIT WITH A RESUME FUNCTION

[75] Inventors: Toshimitsu Saito; Masahiko Kasashima; Toshikazu Konno, all of Tokyo, Japan

[73] Assignee: Kabushiki Kaisha Toshiba, Kawasaki, Japan

[*] Notice: The term of this patent shall not extend beyond the expiration date of Pat. No. 5,467,469.

[21] Appl. No.: 400,827

[22] Filed: Mar. 8, 1995

Related U.S. Application Data

[63] Continuation of Ser. No. 173,877, Dec. 27, 1993, Pat. No. 5,467,469, which is a continuation of Ser. No. 572,246, Aug. 27, 1990, abandoned.

[30] Foreign Application Priority Data

Aug. 28, 1989 [JP] Japan ................................ 1-100572
Nov. 30, 1989 [JP] Japan ................................ 1-309144
Mar. 20, 1990 [JP] Japan ................................ 2-68079

[51] Int. Cl.⁶ .......................... G06F 11/30; G06F 12/16
[52] U.S. Cl. .................... 395/182.12; 395/750; 395/375
[58] Field of Search .......................... 395/575, 182.13, 395/182.2, 182.22, 184.01, 182.12, 181, 180, 750, 375

[56] References Cited

U.S. PATENT DOCUMENTS

| | | | |
|---|---|---|---|
| 4,458,307 | 7/1984 | Mc Anlis et al. | 395/182.2 |
| 4,632,398 | 12/1986 | Freeman et al. | 273/148 B |
| 4,763,333 | 8/1988 | Byrd | 395/182.2 |
| 4,767,341 | 8/1988 | Lund | 439/60 |
| 4,907,150 | 3/1990 | Arroyo et al. | 395/182.22 |
| 5,008,846 | 4/1991 | Inoue | 364/707 |
| 5,021,983 | 6/1991 | Nguyen et al. | 367/707 |
| 5,218,607 | 6/1993 | Saito et al. | 395/182.2 |
| 5,467,469 | 11/1995 | Saito et al. | 395/182.12 |

FOREIGN PATENT DOCUMENTS

| | | |
|---|---|---|
| 0230351 | 7/1987 | European Pat. Off. . |
| 0061832 | 5/1980 | Japan . |
| 62-201861 | 12/1987 | Japan . |
| 63-175228 | 11/1988 | Japan . |

OTHER PUBLICATIONS

IBM Technical Disclosure Bulletin, vol. 15, No. 1, Jun. 1972, pp. 33–33A, R. C. Mattern, "Loose Connector Detection".

*Primary Examiner*—Robert W. Beausoliel, Jr.
*Assistant Examiner*—Ly V. Hua
*Attorney, Agent, or Firm*—Oblon, Spivak, McClelland, Maier & Neustadt

[57] ABSTRACT

Upon detecting removal of a display section from a computer unit's main body, dismounting a battery, removal of a memory board from the computer unit's main body or the like, the CPU saves system data no matter whether or not the resume mode is on and turns off the main power supply. Subsequently when the power switch is turned on the CPU checking if said system data is saved. The CPU restores said system data and restarts the data processing in case where the preservation of said system data is detected.

13 Claims, 12 Drawing Sheets

COMPUTER UNIT WITH A RESUME FUNCTION

This is a Continuation, of application Ser. No. 08/173,877 filed on Dec. 27, 1993, now U.S. Pat. No. 5,467,469, for which a Notice of Allowance has been issued, which is a Continuation of application Ser. No. 07/572,246 filed on Aug. 27, 1990, and which is now abandoned.

BACKGROUND OF THE INVENTION

1. Field of the Invention

The present invention relates to a computer with a resume function, and particularly to such a computer arranged capable of executing resume processing independently of whether or not the resume function is on whenever the operator performs a predetermined operation.

2. Description of the Related Art

A computer which runs with power from a battery provided therein is known. With such a computer, removal of a battery from the computer while it is running turns off the power supply, whereby data in the present working storage will undergo damage.

A computer which is arranged capable of dismounting its display device is known. The computer of a such an arrangement will have an interface circuit, etc. of the display device subjected to damage if the display device is dismounted from or mounted to a computer main body while the computer is running.

A computer which requires an option board to achieve a relatively complex function is known. The memory cards which a lap top type computer, etc. employs for a functional extension is a kind of the option board. The conventional computer can not detect removal of the option board from a computer main body while the computer is operating. The result is that, even after removal of the option board, the computer proceeds with normal data processing as if the option board remains in place. Thus, with the conventional computers, option board mounting/dismounting entails damaging their hardware circuits, as well as system data or concurs with program wild running or giving rise to further problems.

A computer which is equipped with the conventional resume function is known. The resume function refers to such a function capable of saving the data necessary to continue data processing in response to turning-off of the main power and restart executing the program from the stopped portion. To date, however, no attempt has ever been made to resolve the aforementioned various problems, using such a resume function.

SUMMARY OF THE INVENTION

The present invention was realized in view of such realities touched upon above in the foregoing, aiming to provide computers, each with higher reliability than ever achieved.

It is another object of the present invention to provide a computer which is assured to have its hardware and software systems protected against damage and other troubles, with resume processing forcibly done whenever the user performs a predetermined operation.

A further object of the present invention is to provide a computer which is ensured capable of protecting both the hardware and software systems against damage and so forth by turning off the main power supply, following force-execution of resume processing, whenever the user does a predetermined operation.

To meet the above-quoted objects, a computer unit of the present invention comprises: power switch means for indicating the ON/OFF condition of the main power supply of the computer unit; selector means for designating either resume mode ON or OFF of the computer unit; first data saving means for saving the system data necessary to enable continuation of data processing undertaken by the computer unit when the power switch means indicates the OFF condition of the main power supply while the resume mode ON is designated in response to the power switch means and the selector means; and continuator means for restoring the system data saved in the first data saving means when the power switch means indicates the ON condition of the main power supply while the system data is preserved whereby to continue the data processing based on the restored system data; characterized by further comprising: detector means for detecting a given operation of an operator when the main power supply is on; and second data saving means for saving the system data in response to the detection by the detector means, whether or not the resume mode is ON.

With the computer unit configured such as the above, a predetermined operation such as removal of a battery, an option board, a display, an externally memory or the like from the computer main body by the operator while the computer unit is running, is followed by resume processing, whereby the hardware and software systems of the computer unit are protected against damage, etc.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Now referring to the drawings, some of the preferred embodiments of the present invention are described hereunder.

Figure 1:
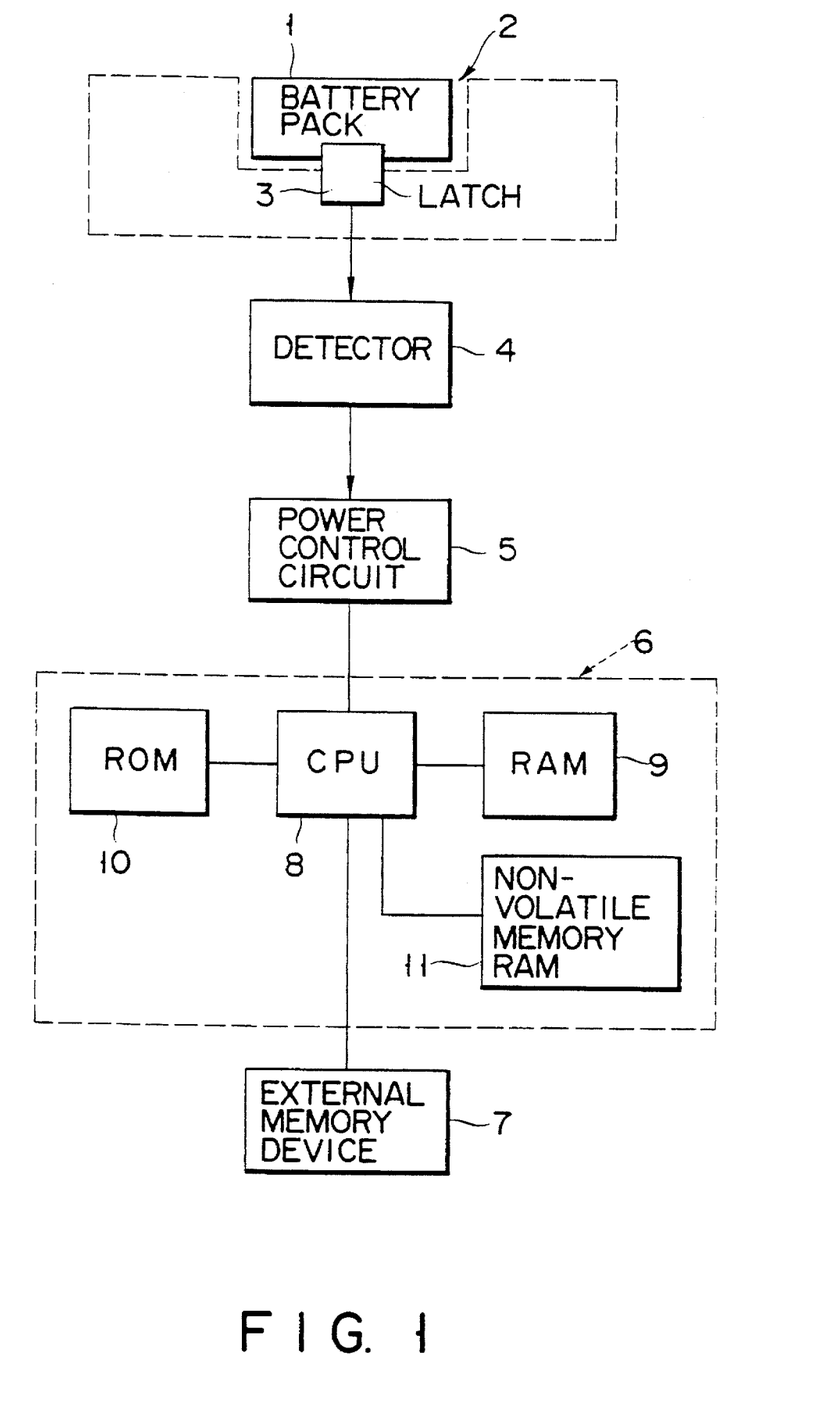
FIGS. 1 and 2 are respective block diagrams, each illustrating the system configuration of the computer unit in each of the 1st and 2nd preferred embodiment of this invention.

FIG. 1 is a block diagram of the computer unit applied in the 1st embodiment of the present invention.

A battery pack 1 shown in FIG. 1 incorporates a battery and provides a power supply to said computer unit. The battery pack is removably installed to a mount 2 of the computer unit main body, using a latch 3. A detector 4 senses whether or not the latch 3 is off its position. Another detector 4 may generally comprise a mechanical contact type switch, an optical switch (a photo interrupter or the like) using a photo sensor, an electromagnetic switch employing an electromagnetic sensor, and so forth. A power control circuit 5 regulates the power supply from the battery pack 1 to the computer unit.

A control 6 may comprise the CPU 8 comprehensively controls the computer unit, a RAM 9 used as a working memory for the CPU 8, a ROM 10 storing a program which the computer unit executes, a non-volatile RAM 11 saving the contents of the RAM 9 and the program in progress, both of which are associated with the resume function, and so on. An external memory 7 such as a floppy disc unit or the like is coupled to the CPU 8.

Next, how the computer unit configured such as shown in FIG. 1 is described.

Removing the latch 3 in an attempt to dismount the battery pack 1 from the mount 2 or by accident with the main power supply to the computer unit on coincides with being detected by the detector 4. Simultaneously with this detection, the detector 4 outputs a signal to the power control circuit 5. In response to this signal, the power control circuit 5 outputs a power OFF command to the CPU 8. Subsequently in response to the power OFF command, the CPU 8 loads both the contents in the RAM 9 and the program currently under way into the non-volatile RAM according to a regular power OFF sequence. When CPU 8 is through with said loading into the non-volatile RAM, it regulates the power control circuit 5 thereby to turn off the main power supply to the computer unit.

Subsequent setting of the battery pack 1 into its position concurs with reading out the whole contents thus far preserved in the non-volatile RAM 11 and loading them into the RAM 9 for restoration therein, whereby the data processing thus far in progress at the time the battery pack 1 was dismounted is rendered executable successively from point stopped in the previous cycle.

with the computer unit in this preferred embodiment, removal of the battery pack 1 from the main body of the computer unit by accident while the computer unit is progressing with data processing entails protecting the data so far being processed by the computer unit prior to completely turning off the main power supply to the computer unit. Further, turning off the main power supply is done according to the regular sequence whereby not only the contents in the external memory 7 but also said memory itself will be protected against damage.

Figure 2:
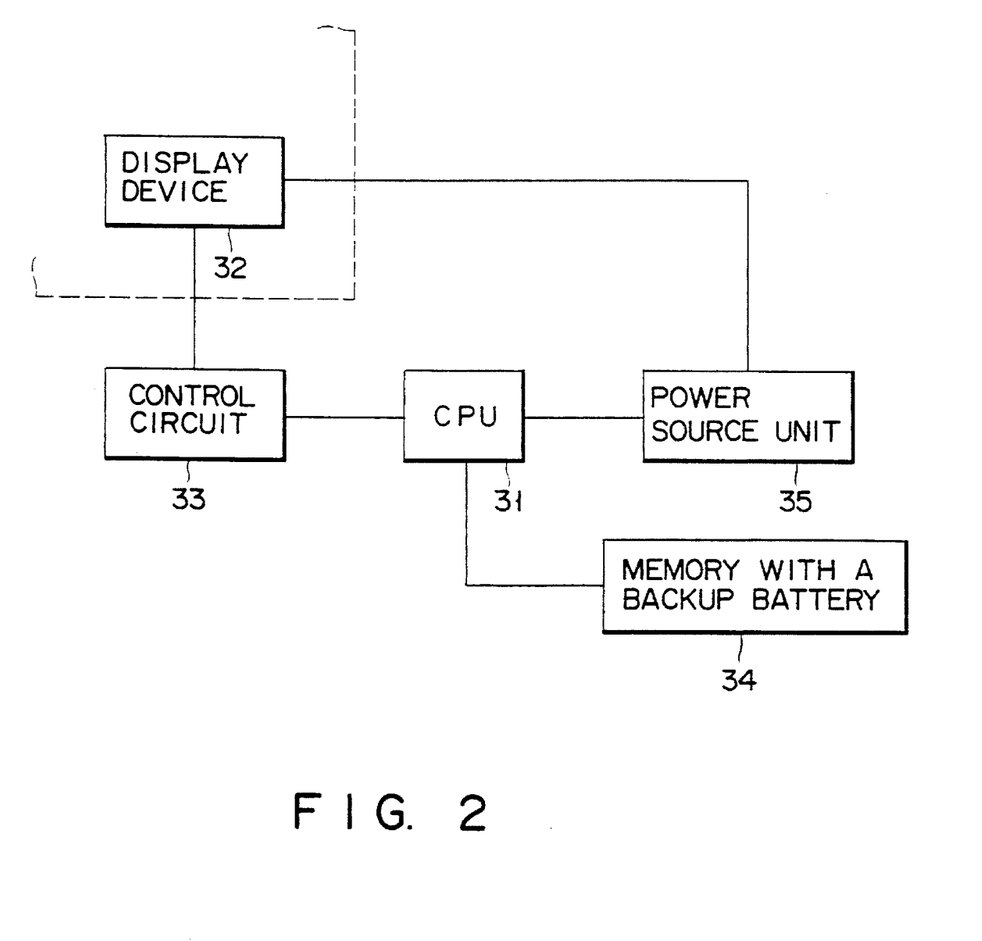

Next, referring to FIG. 2, the computer unit used in the 2nd preferred embodiment of this invention is detailed hereunder. A display device 32 is mountable to and dismountable from the main body of the computer unit, using a detachment mechanism. The information of mounting and dismounting the display device 32 is fed through a control circuit to a CPU 32. A memory 34 with a backup battery stores the data about the system operational state at the time the display device is mounted or dismounted. A power source unit 35 supplies power to the computer in said embodiment and is provided with a function to force-interrupt the power supply when a display device 34 is mounted or dismounted.

How the computer unit of said 2nd preferred embodiment of the present invention works is not illustrated hereunder.

The information about mounting the display device 32 to or dismounting thereof from the main body of the computer unit while said computer unit is running with the power from the power source unit 35 is fed to a CPU 31 by way of the control circuit. In response to the reception of said information, the CPU 31 load system data into a memory 34. Following the completion of loading said system data into the memory 34, the CPU 31 outputs a power supply interruption signal to the power source unit 35. In response to the reception of said signal, the power source unit 35 stops supplying power to the computer unit and the display device 32.

Turning on the power source unit 35 after completing the mounting or dismounting the display device 32 to the main body of the computer unit concurs with the CPU 31 instructing to restore the data so far preserved in the memory 34 in its original place so as to restart the computer unit.

Thus, according to said 2nd preferred embodiment of the present invention, system safety and reliability at the time a display is mounted to or dismounted from the computer unit may assuredly be improved.

Figure 3:
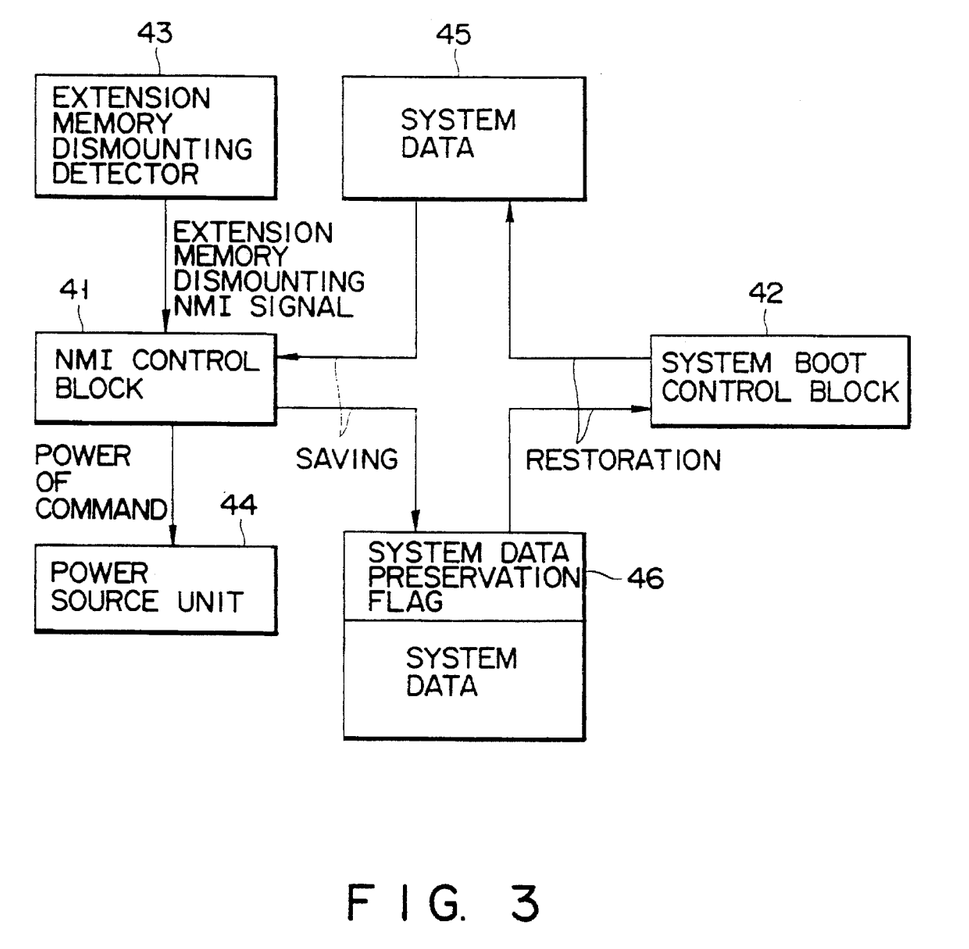
FIG. 3 is a block diagram depicting how the computer unit in the 3rd preferred embodiment of the present invention is configured and operates.
Figure 4:
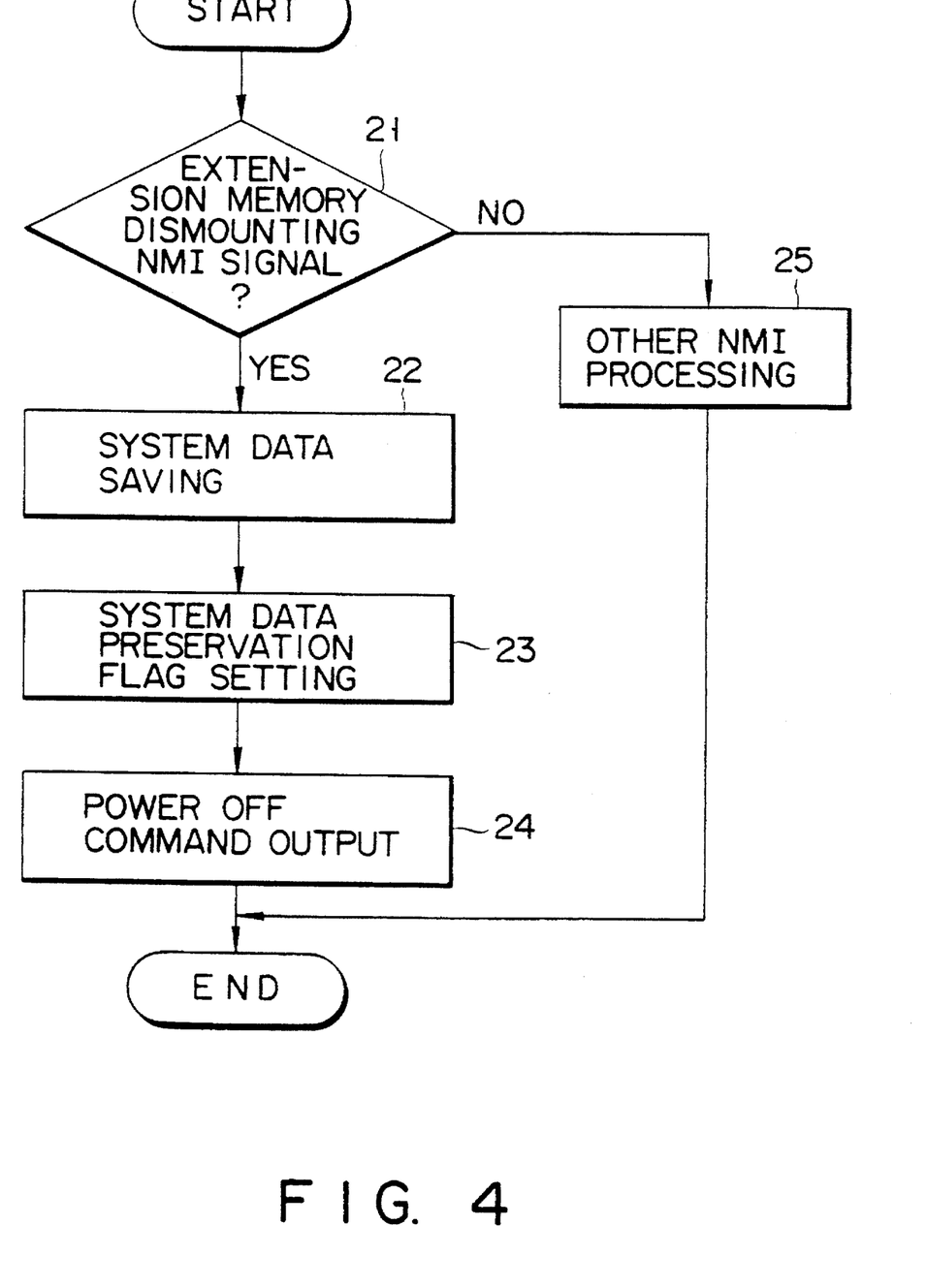
FIGS. 4 and 5 are respective flowcharts illustrating how the computer unit of the 3rd preferred embodiment of the present invention operates.
Figure 5:
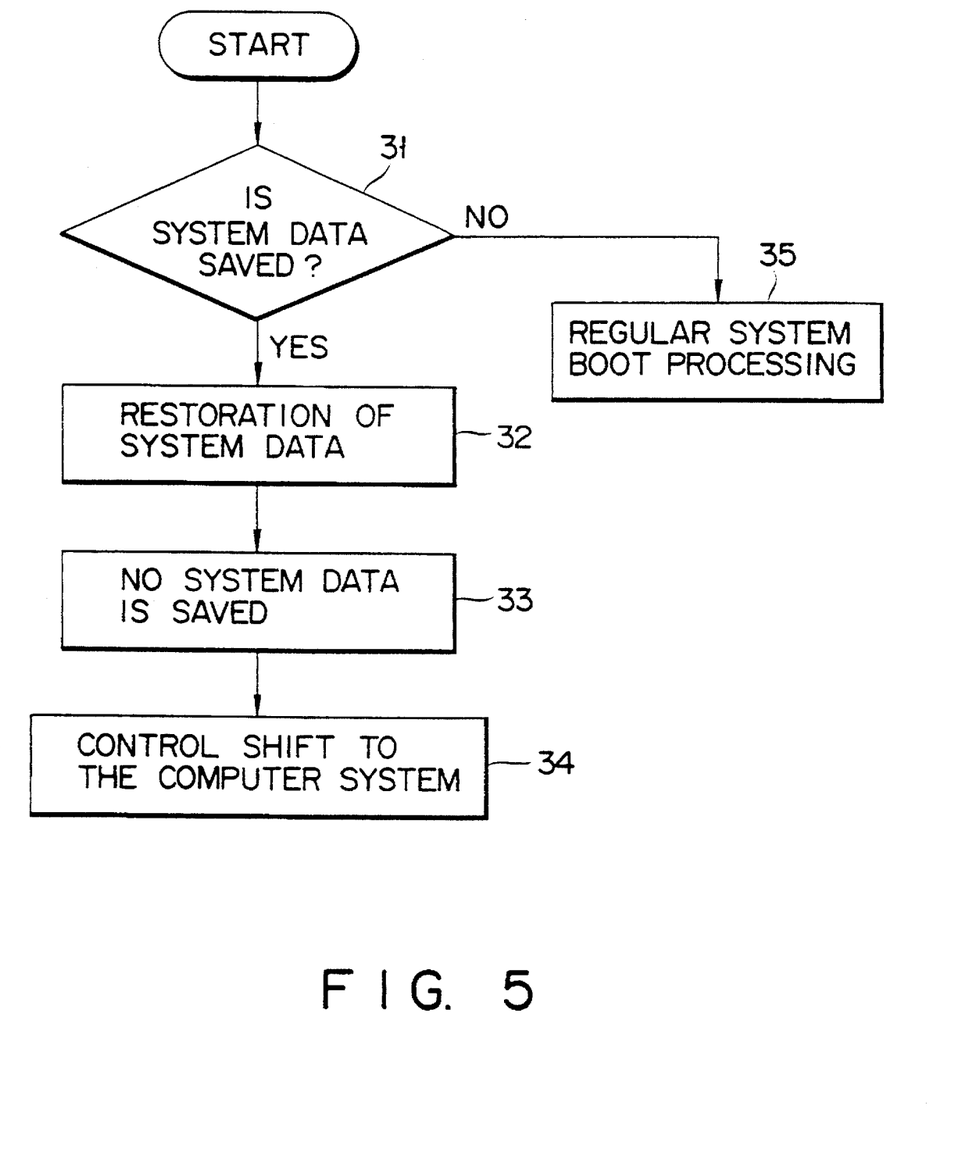

Now referring to FIGS. 3 through 5, the computer unit of the 3rd preferred embodiment is described hereunder.

FIG. 3 is a block diagram showing the configuration of this embodiment, and how it works.

With reference to FIG. 3, an NMI control block 41 undertakes a variety of NMI processings such as preservation of system data and outputting a power OFF command to a power source unit (a power supply device) 44. A system boot control block 42 implements system boot processing, wherein turning on the power supply, followed by a finding that system data is preserved, restores the system data in its original place. A dismounting detector 43 outputs an NMI signal of extension memory removal whenever an extension memory is dismounted from the computer unit main body. When fed with the power OFF command, the power source unit 44 turns off, stopping the power supply to the computer unit. System data 45 includes the contents in each CPU register (not shown), and those respectively in each LSI memory, volatile, RAM and other memories. Preserved system data 46 includes the system data and a system data preservation flag. The preserved system data 46 is stored either in an external memory of a backup memory.

Now referring to FIGS. 4 and 5, how the computer of the 3rd preferred embodiment operates is described hereunder.

When an extension memory is removed from the computer unit main body, a dismounting detector 43 detects the removal and subsequently outputs an extension memory removal NMI signal. An NMI signal is followed by NMI processing as shown in FIG. 4, wherein the category of the NMI signal concerned is first determined (step S21). If the NMI signal is of the extension memory removal, the system data is preserved in a backup memory (step 22). Subsequently, a system data preservation flag 46 is set (step S23). Then, the power OFF command is output to the power source unit 44. In response to the reception of said command, the power source unit 44 turns off, suspending the main power supply. In the event the NMI signal output in step S21 is determined as a signal other than the extension memory removal NMI signal, different processings are undertaken for step 26 instead of a series of steps referred to above.

Next, setting the extension memory again to the computer unit and then turning on the power switch entails the execution of system boot processing as shown in FIG. 5 wherein the system boot control block 42 first make sure whether or not the system data preservation flag has been set (step 31). Where the system data preservation flag is found to have been set, the system data preserved in the backup memory 46 is restored in its original place (step S32), with the system data preservation flag 46 cast off (step 33). Thereafter, a shift is made from system boot control to normal system control. When it is detected that the system data preservation flag 46 is not set, normal system boot processing is executed (step S35).

Thus, following this preferred embodiment of this invention, a protection may assuredly be provided against damage to hardware circuits and a wide program run even when an extension memory is removed from the computer unit with the main power supply on.

Hereunder, a description is made, referring to FIGS. 6 through 12, of the 4th preferred embodiment of this prevention.

Figure 6:
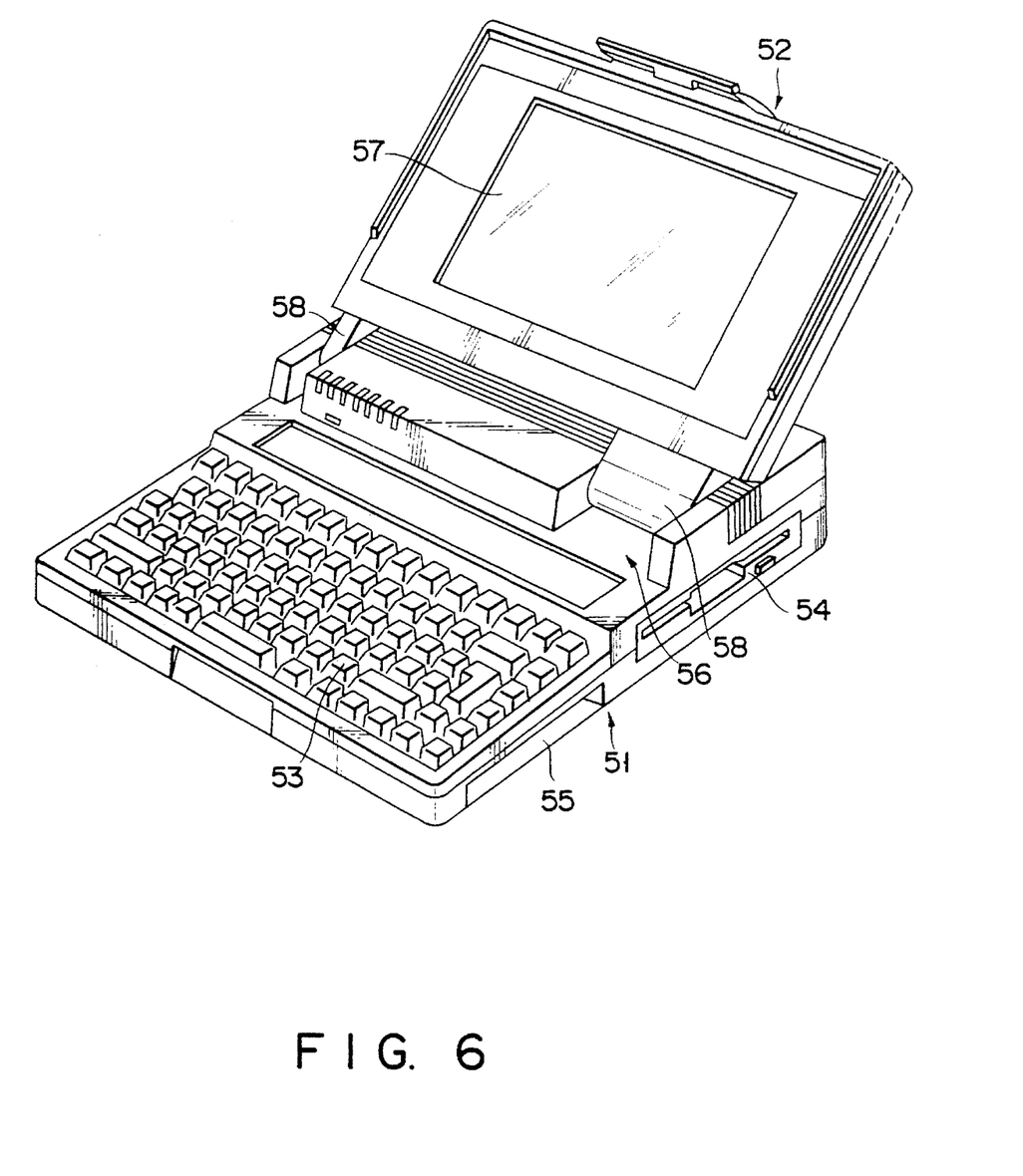
FIG. 6 is an external view, at a certain slant angle, of the computer unit in the 4th preferred embodiment of the present invention.
Figure 7:
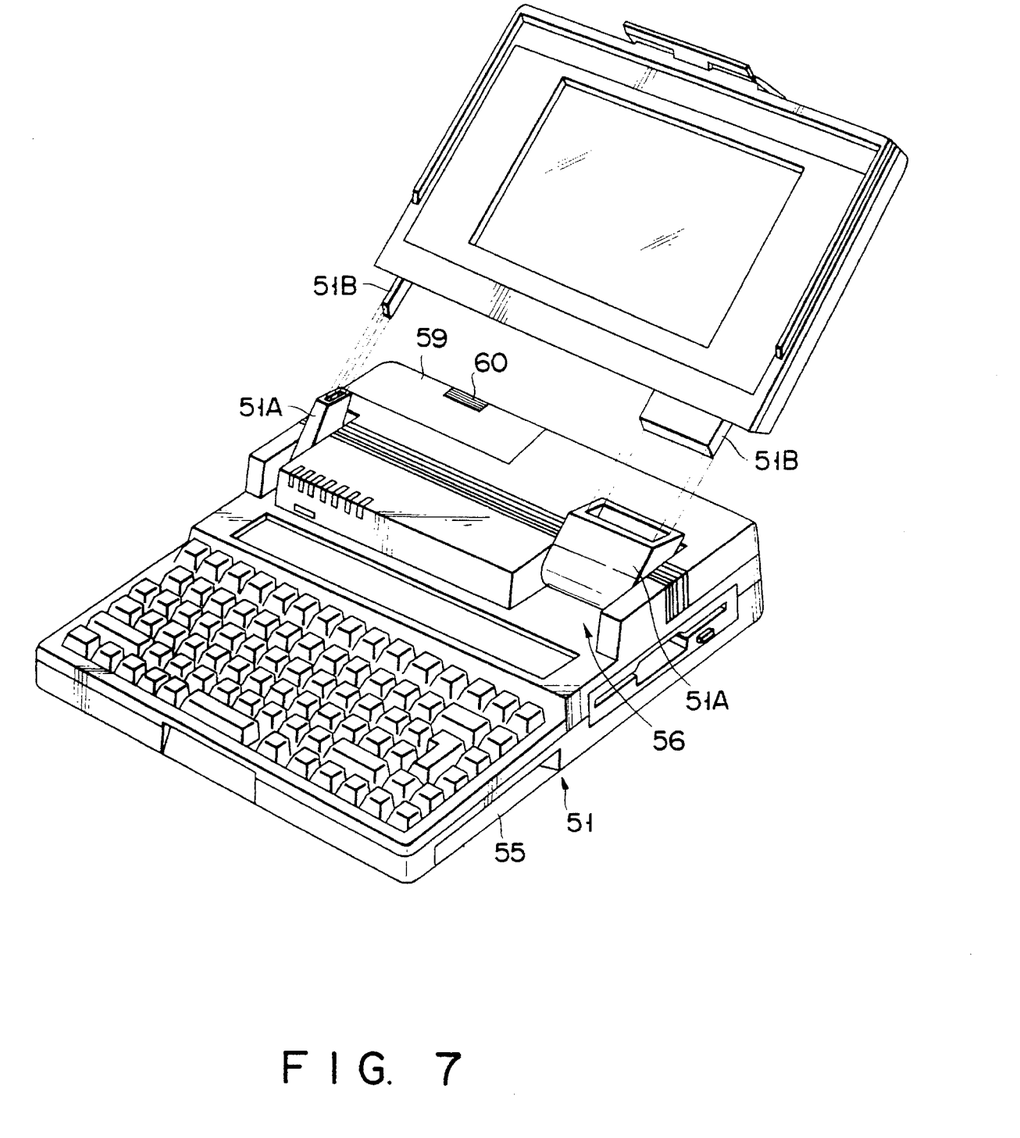
FIG. 7 is an external view, at a certain slant angle, of the computer unit with the main body and a display section separated and which is presented in FIG. 6.
Figure 8:
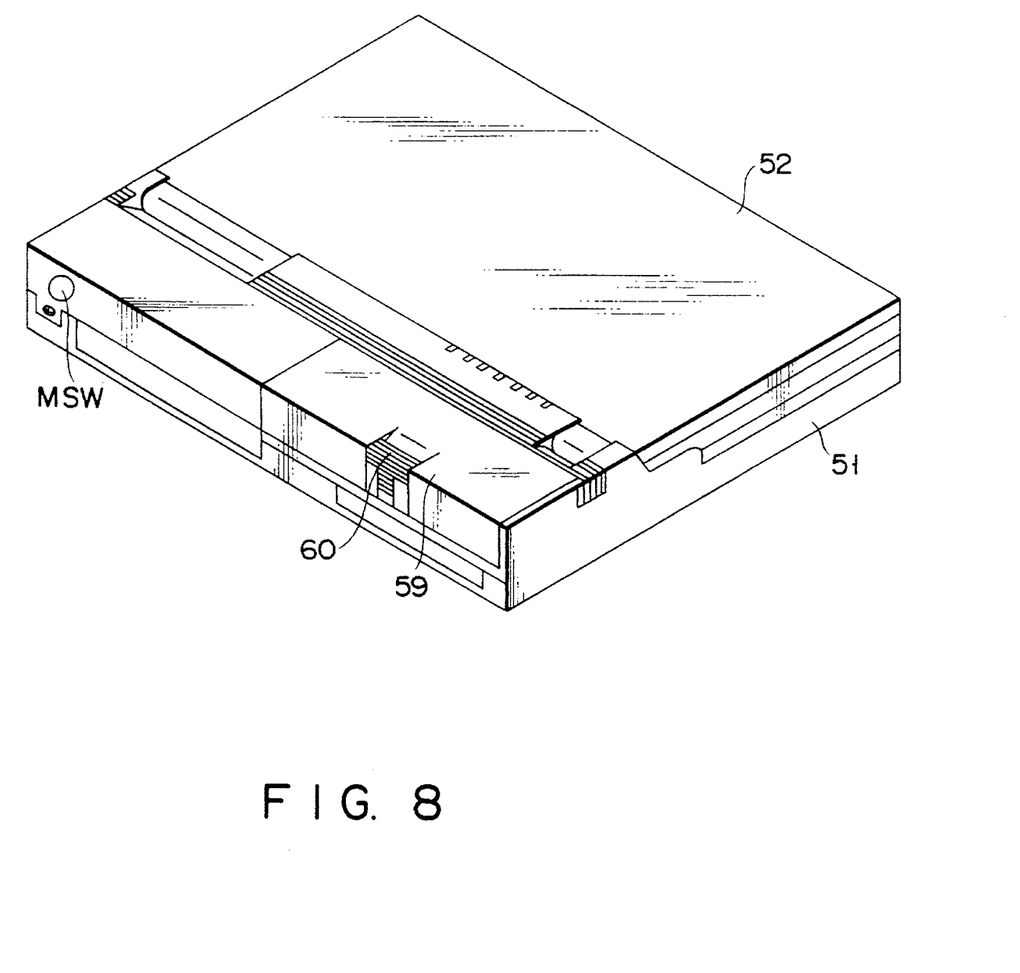
FIG. 8 is an external view in a certain slant angle showing the back of the computer unit presented in FIG. 6.

First, the external structural configuration of the computer unit employed in said preferred embodiment is illustrated, referring to FIGS. 6 through 8.

The computer unit of this preferred embodiment comprises a main body 51 and a display section 52 and a hinge part 56.

The main body 51 includes a keyboard 53, a floppy disc unit 54, and an opening 55 into which to insert a memory board (an extension memory board) to expand the memory capacity. A main switch to indicate whether or not the main power supply is on is arranged at the rear of the main body 51. To detect if the memory board has been put into a slot 55, a detector (a microswitch or a photo switch not shown in the figures involved) (SW3) is also arranged within the slot.

The display section 52 pivots about a hinge part 56. A display 57 is included in the display section.

The hinge part 56 comprises a shaft portion (not shown) turnably retaining two leg parts 58. Each leg part comprises a female type locking member 51A secured to the shaft portion, and a male type locking member 51B fixed at the lower end of the display section 52. Releasing the lock provided for these members makes possible to separate said female type and male type locking members apart. Inserting the male type locking member 51B into the female type locking member 51A couples together the connectors provided respectively for the female type and male type locking members 51A and 51B, whereby the display section 52 is connected both physically and electrically. A detector switch is arranged within the female type locking member 51A to check if the male type locking member 51B is completely clamped to the female type locking member 51A or whether or not the female type locking member 51A is completely apart from the male type locking member 51B. This detector switch comprises microswitches, a photo sensor or the like, for example.

At the rear of the main body 51 of the computer unit a battery pack 59 is mounted to provide the computer unit with necessary power. Working a locking knob 60 enables to dismount the battery pack 59 from the main body 51. At the part where the battery pack 59 is accommodated, there is provided a detector switch to check the dislocation of the battery pack 59.

Figure 9:
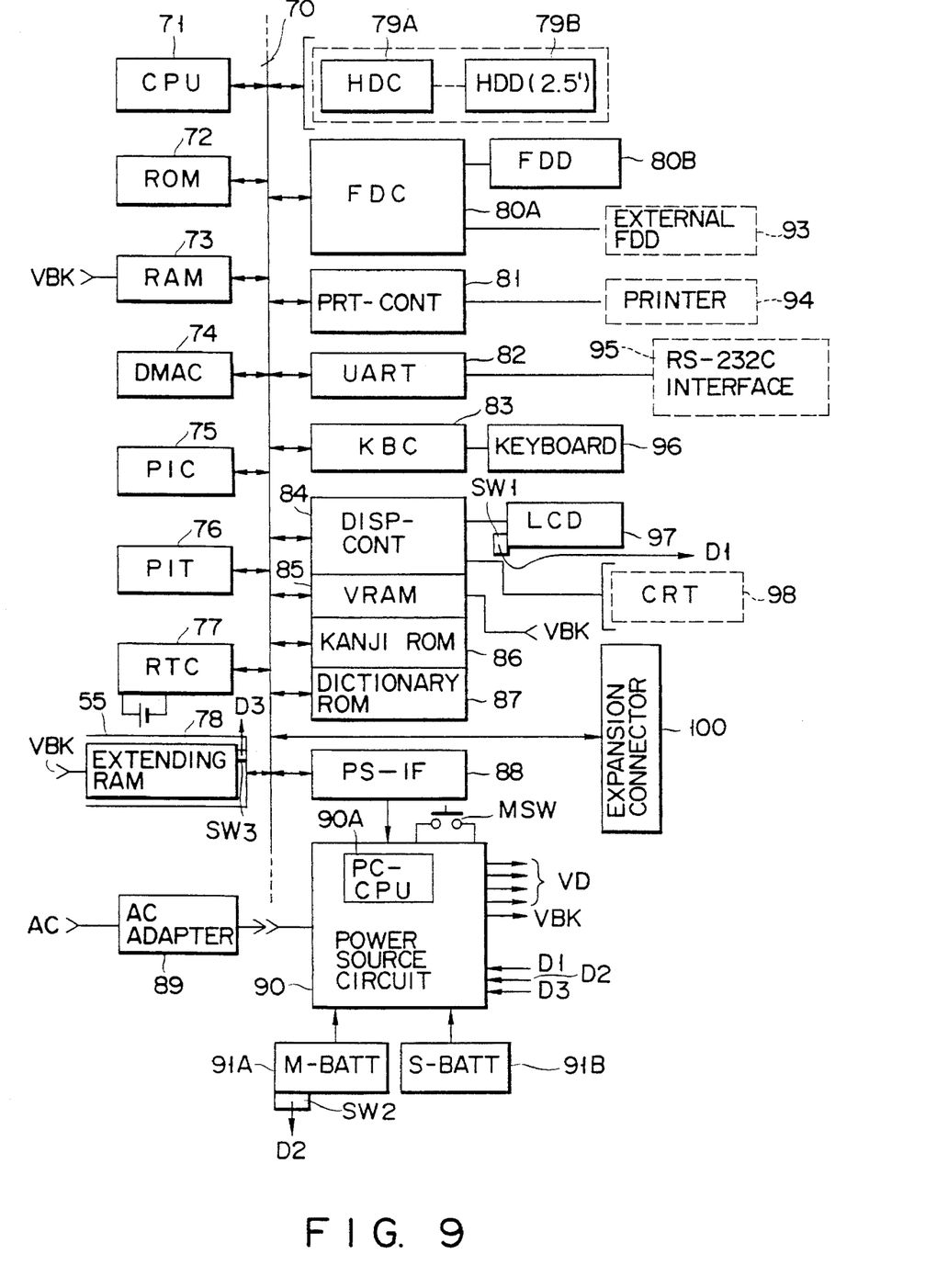
FIG. 9 is a circuit block diagram of the computer unit presented in FIG. 6.

Now referring to FIG. 9, how the computer unit circuit is configured is described hereunder.

In FIG. 9, the system bus 70 comprises a data bus, an address bus, and a control bus, whereby the transfer of data necessary to run the system is thus practicable. The CPU 71 coupled to the system bus 70 controls the system entirety. The ROM 72 couples to the system bus 70 stores a fixed program and fixed data, such as BIOS (basic input/output system) data or the like. The RAM 73 coupled to the system bus 70 keeps the program to assume data processings concerned and those data involved plus various categories of data, flags, numerical data of pointers and so forth necessary for resume processing. A backup power supply (VBK) is provided to the RAM 73 to prepare for the case of accidental, sudden suspension of the main power supply.

A direct memory access controller (DMAC) 74 undertake direct memory access control. Meanwhile, a programmable interrupt controller (PIC) 75 regulates interruptions, following the respective commands designated in a program. A programmable interval timer (PIT) 76 is to set a required interval according to the corresponding command designated in a program. A real-time clock (PTC) 77 is a clock module having its own battery for self run.

Putting a memory board (an extension memory card) into the slot 55 dismountably increases the capacity of the main memory of the computer unit. Further, inserting the memory board 78 into the slot 55 automatically couple together the memory board 78 and the computer unit main body. The detector (SW3) detects whether or not the memory board 78 has been put into the slot 55 in which said detector is arranged. Putting the memory board into the slot 55 concurs with the detector (SW3) outputting a detection signal (D3) to a PC-CPU 90A which will be described later. A HDD controller 79A controls a HDD 79B, following the instructions from the CPU 71. The HDD 79 makes an access to the hard disc. An FDD controller 80A controls an FDD 80B under the instructions from the CPU 71. The FDD controller 80B makes an access to the floppy discurrently in use. An external FDD 93 is connectable to the FDD 80A. A print controller (PRT-CONT) 81 controls the printer 94 which is coupled thereto as occasion demands. A UART (universal asynchronous receiver/transmitter) 82 transmits data to and receives it from an external device via an interface 95.

The keyboard controller 83 coupled to the system bus 70 controls the keyboard and feeds to the CPU 71 the data input from the keyboard.

A DISP-CONT 84 controls a display 97 (the display 57 in FIGS. 6 through 8) which is dismountably installed to the computer unit main body. When operator dismounts the display 97 from the computers unit main body or if the operator mounts said display 97 to said main body, the detector (SWl) outputs a detection signal (D1) to the CP-CPU 90A.

The DISP-CONT (display controller) 84 has a CRT 98 coupled thereto whenever required.

A volatile RAM 85 is a video RAM provided with the backup power supply (VBK) and which stores the video data presented on the display. A KANJI ROM 86 stores each pair of a KANJI character code and a KANJI character pattern. Therefore, by reading out a certain KANJI character code in each pair, the corresponding KANJI character pattern is obtained. A dictionary ROM 87 holds the data requires to convert the KANA characters into the KANJI characters.

The PC-IF 88 is a power supply control interface necessary to couple the power supply circuit 90 to the CPU 71 via the system bus 70. With the AC adapter 89 applied to rectify a commercial-use AC current with its waveform smoothed, the DC current of a specified potential is made available. The AC adapter 89 is coupled to the main body 51 of the computer unit through a plug-in type connection. The power supply circuit 90 is furnished with a power control CPU (PC-CPU) 90A with power control speciality and a power switch MSW. The power supply circuit 90 always monitors internal power supply conditions, following the instruction from the PC-CPU 90A and supplies a working voltage (VD), a backup power supply voltage (VBK) and so forth. The power switch MSW instructs a shift between turning-on and off of the main power supply. The power supply conditional data showing whether or not the main power supply is on are loaded into a non-volatile memory within the power supply circuit 90 for storage.

The battery 91A is housed within the battery pack and comprises rechargeable cells. Removal of the battery 91A concurs with detector switch SW2 detecting the dismounting thereof and subsequently outputting the detection signal D2 to the PC-CPU 90A. The battery 91B comprises rechargeable cells and provides a sub-battery incorporated in the computer unit main body.

The extension connector 100 has an extension unit coupled thereto whenever required.

Figure 10:
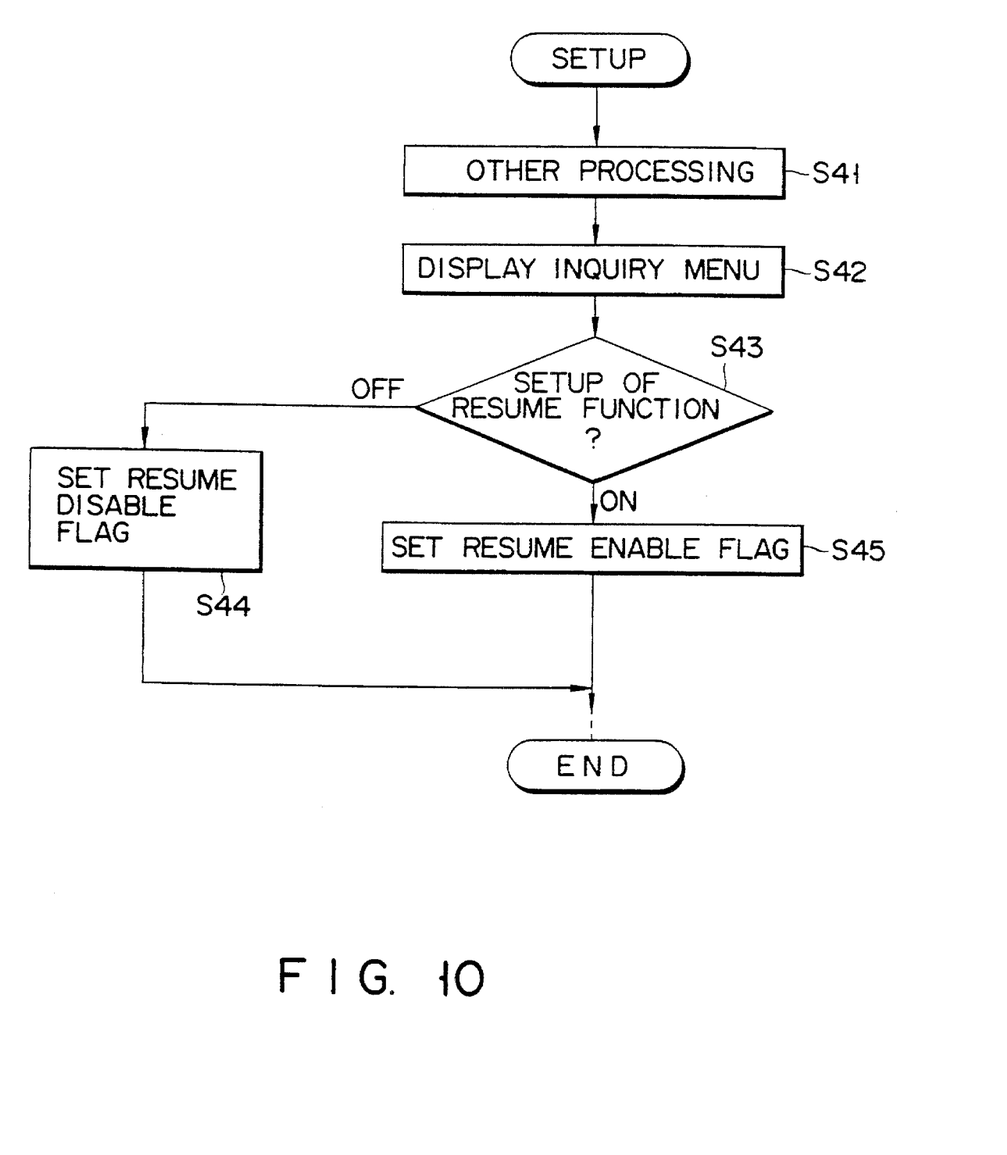
FIGS. 10 through 12 are respective flowcharts, each showing how the computer unit presented in FIGS. 6 through 9 runs.
Figure 11:
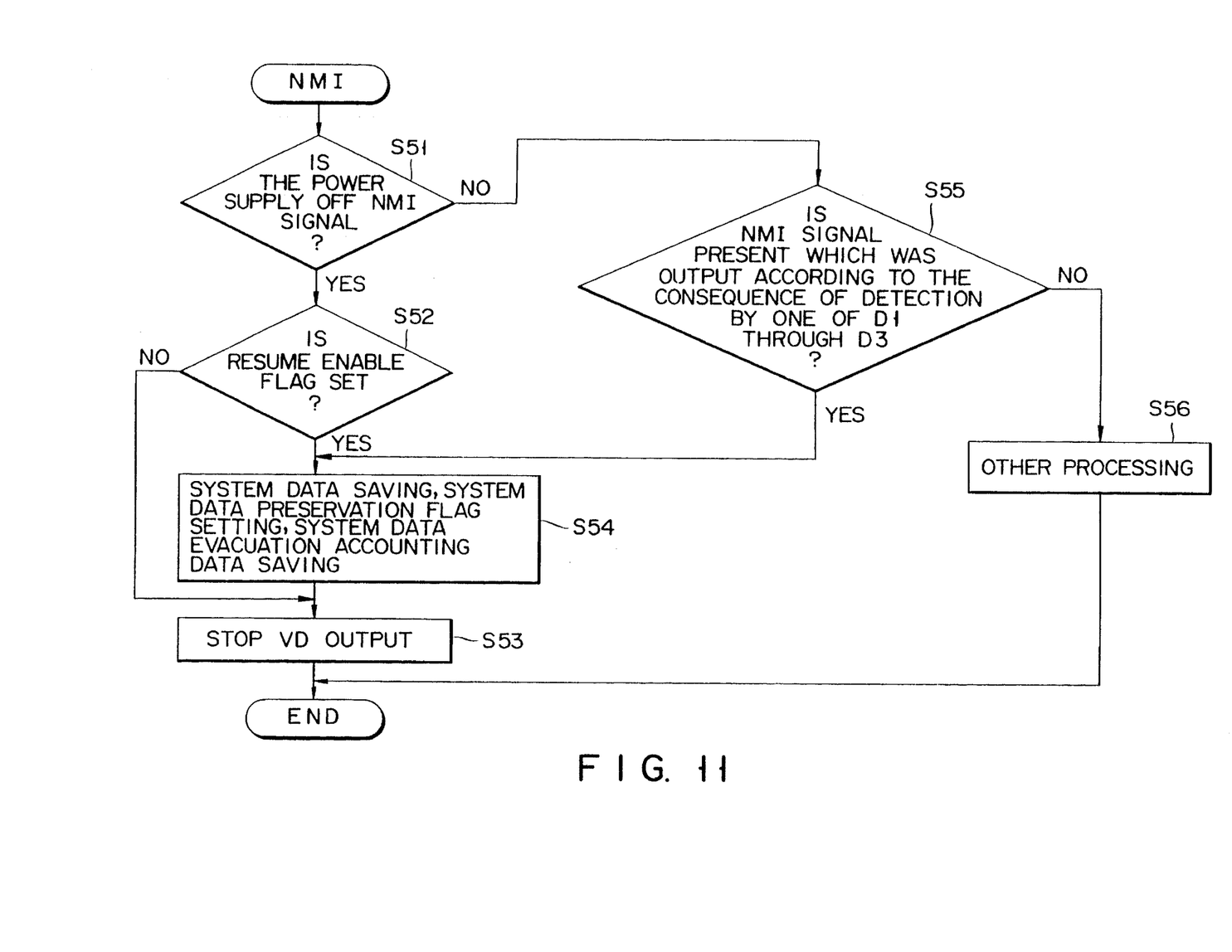
Figure 12:
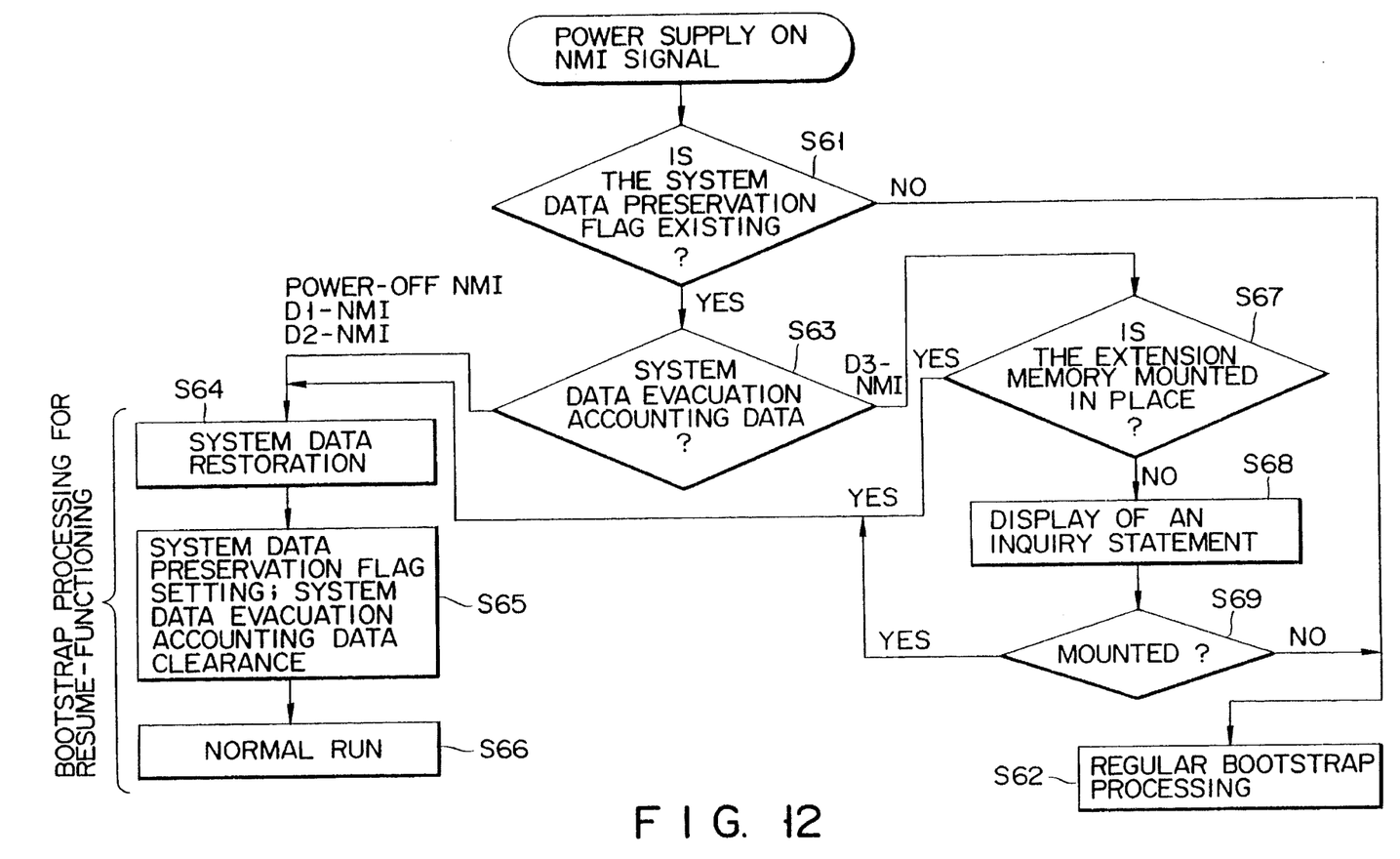

Next, how the computer unit configured as in the foregoing run is described in details, referring to FIGS. 10, 11 and 12.

First of all, a description is now be made on how the resume function is set, referring to FIG. 10.

Working a given key of the keyboard or inputting a given command likewise through key operation thereon starts a setup program shown in FIG. 10. The setup program includes a variety of contents for data processing which are sequentially executed (step S41). When the data processing reaches a predetermined resume function on/off stage, the CPU 71 instructs the display controller 84 thereby to cause the display 87 to present on its screen a statement of the inquiry as to whether or not the resume function is to be turned on (step S42). The operator in response to this statement operates the keyboard 87 to input an instruction regarding whether or not the resume function should be turned on. The instruction thus input is checked (step S43).

Where the input instruction designates that the resume function is off, the CPU 71 sets (or resets a resume enable flag) a resume disable flag at a given position (step S44). Thereafter, a shift is made to another data processing as given by the flowchart.

On the other hand, in case the input instruction specifies that the resume function is on, the CPU 71 sets the resume enable flag at a given position within the RAM 73 to instruct that the resume function should be turned on.

Then, a shift is likewise made to another data processing as given by the flowchart.

Next, where the power switch MSW is worked while the main power supply is on, how the system operation proceeds is illustrated. Operation of the power switch MSW is detected by the PC-CPU 90A. The PC-CPU 90A checks the power supply conditional data and gives forth an instruction as to whether or not the main power supply should be turned off. In response to this instruction, the PC-CPU 90A outputs an NMI signal to turn off the main power supply through the PC-IF 88 to the CPU 71. Successively, in response to the NMI signal, the CPU 71 starts such data processing as given in FIG. 11.

Precisely with this data processing, the CPU 71 first determines the category of said received NMI signal in step S51, wherein the received NMI signal is a power supply OFF NMI signal, whereby the flow proceeds to step S52. At step S52, the CPU 71 checks whether or not the resume enable flag has been set at a given position within the RAM 73. In case no resume enable flag is found to have been set therein, in step S53, the CPU 71 sends out a command to the PC-CPU 90A to render the PC-CPU 90A stop providing a VD working voltage (with a VBK backup power supply voltage kept on). Namely, in step S53 the main power supply is turned off.

In the meanwhile, where it turns out that the resume enable flag has been set within the RAM 73, the CPU 71 gives forth an instruction to save the system data (including the contents in each register within the CPU 71, those contents in various hardware registers, contents of an instruction pointer, and so forth) in the RAM 73. Thereafter, a system data preservation flag showing that the system data is saved in the RAM 73 is set therein. Further, the CPU 71 loads into the RAM 73 the data to account for that the reason of having saved this time the system data therein stemmed from working the power switch MSW.

Next, where the display section 52 is dismounted from the computer unit main body 51 while the main power supply is on, or the display section 52 is mounted to said main body 51 with the main power supply on, how the system operates is described hereunder. In this case, the detector SW1 output the D1 detection signal to the PC-CPU 90A. In response to the D1 detection signal, PC-CPU 90A outputs the NMI signal to the CPU 71. In response to the NMI signal, the CPU 71 starts for NMI processing shown in FIG. 11.

The CPU 71 discriminates the category of said received NMI signal in the step S51, with the flow proceeding to step S55. In step S55, the CPU 71 checks whether or not said NMI signal has been output in response to either one of D1 through D3 detection signals. In this case, said received NMI signal has been given forth in response to a D1 detection signal, whereby the system operational flow advances to said step S54. In step S51, no matter whether or not the resume enable flag has been set within the RAM 73, the system data is force-saved therein, with the system data preservation flag getting subsequently set within the RAM 73. Further, the data to account for that the reason of having this time saved the system data in the RAM 73 resulted from the reception of the D1 detection signal is loaded therein, with the system operational flow proceeding to the step S53.

Now, how the system operates when the battery pack 59 is dismounted from the computer unit main body 51 with the main power supply on is illustrated hereunder.

In this case the detector SW2 outputs the D2 detection signal to the PC-CPU 90A. In response to this D2 detection signal, the PC-CPU 90A sends out the NMI signal to the CPU 71. Successively, in response to said NMI signal, the CPU 71 starts for NMI processing.

The CPU 71 discriminates the category of the received NMI signal, and subsequently, the flow goes to step S55. In this case, sending out the NMI signal has been implemented in response to the D2 detection signal, whereby the flow proceeds to step S54 via respective steps S51 and S55. In step S54, the system data is saved in the RAM 73 and the system data preservation flag is also set therein. Further, the data to account for that the background of having saved the system data into the RAM 73 stemmed from the reception of the D2 detection signal is loaded therein.

Next, how the system runs where the extension memory board 78 is pulled out from the slot 55 while the main power supply is on is described. In this case, the detector SW3 outputs the D3 detection signal to the PC-CPU 90A. In response to the D3 detection signal, the PC-CPU 90A sends forth the NMI signal to the CPU 71. Successively in response to the NMI signal, the CPU 71 starts said NMI processing. The NMI signal this time has been given forth in response to the D3 detection signal whereby the system operational step goes forth to step S54 by way of respective steps S51 and S55. In step S54, the system data is saved in the RAM 73 and the system data preservation flag is set therein. Further, the data to account for that the background of having saved the system data in the RAM 73 stemmed from the reception of the D3 detection signal is loaded therein, with the flow subsequently advancing to said step S53.

As described above, in said preferred embodiment, the detection of a given operational step or procedure done by the user is followed by force-saving the system data in a certain memory, no matter whether or not the resume mode has been set according to a setup program, in preparation or resume processing to be started when the main power supply is restored.

Next, how the system operates when the power switch MSW is turned on with the main power supply to the computer unit off is described hereunder.

Nevertheless the main power supply is off, the PC-CPU 90A is kept running; therefore, working of the power switch MSW is detected. In response to the detection of working on the power switch MSW, the PC-CPU 90A checks the power supply conditional data to make sure whether the main power supply should be turned on or off. Successively, the PC-CPU 90A checks each of the D1 and D2 detection signals.

Whenever either one of the detection signals D1 and D2 is output to the PC-CPU 90A, it ignores working the power switch MSW. In other words, the PC-CPU 90A does nothing particular, when the power switch is worked in the situation that the display section 52 is removed from its mounting position or it is in process of mounting, or the battery pack 59 is removed from its place. Meanwhile, none of the detection signals D1 and D2 is on, the PC-CPU 90A controls the power supply circuit 90, causing said power supply circuit to start supplying a VD working power to the components presented in FIG. 9, whereby the CPU 71 starts running. In addition, the PC-CPU 90A outputs to the CPU 71 the NMI signal instructing the restoration of power supply. In response to this NMI signal, the CPU 71 starts the data processing specified in FIG. 12. First, the CPU 71 checks if the system data preservation flag has been set within the RAM 73 (step S61). In the event no system data preservation flag is found to have gone through setting in the RAM 73, the CPU 71 execute normal bootstrap processing (step S62) including hardware initializing, etc.

On the other hand, when it is detected that the system data preservation flag has been set within the RAM 73, the background of having saved the system data in the RAM 71 is examined (step S63). In the event said background is found with the respective consequences of turning off the power switch MSW, or outputting any one of the detection signal D1 or D2, the flow proceeds to step S64, wherein the CPU 71 gives forth in instruction to restore in the original place the system data which has so far saved in the RAM 73. Precisely in this regard, the contents of each CPU register thus far kept within the RAM 73 are put back to each of the CPU registers; the contents of the pointer are transferred back to the pointer; and the contents of the hardware register are similarly restored therein. Successively, the system data preservation flag is cast off, and the data to account for the background of having saved the system data in the RAM 73 is cleared (step S65). Thereafter, the CPU 71 continues running according to the program loaded in the RAM 73 (step S66). Through a series of these steps, data processing so far in progress up a certain point immediately before the main power supply to the computer unit is resumed from said point where said data processing has been interrupted, when the main power supply turns on again.

On the other hand, if the reason behind having saved the system data in the RAM 73 is ascertained stemming from receiving the D3 detection signal in step S63, the flow advances to step S67, wherein the CPU 71 inquires of the PC-CPU 90A about whether or not the D3 detection signal is on. In case the D3 detection signal is confirmed off, namely where the memory board 78 is set properly in the slot 55, the flow moves forward to step S64 wherein the system data thus far saved in the RAM 73 are restored in respective original places. Thereafter, the flow further advances to step S65, with a subsequent shift made for regular data processing.

In the meanwhile, where step S67 concurs with the finding that the memory board 87 is not set properly in the slot 55, the flow goes to step S68 wherein the CPU 71 regulates the display controller 84 whereby to render the display device 97 give a statement as to whether or not the memory board 87 should be set in the slot 55. Putting the memory board 87 into the slot 55, following said statement on the display device entails turning off the D3 detection signal. The fact that the D3 detection signal has turned off is detected by the PC-CPU 90A, and the CPU 71 is then advised of the consequence of said detection. And in step S71, the advice which the CPU 71 received from the PC-CPU 90A is also detected. Thereafter, the flow proceeds to said step S64 wherein bootstrap processing is undertaken to prepare for resume functioning.

Meanwhile, operator's inputting "NO" by way of the keyboard, for example, in response to the display statement is detected in step S62. In this case, to prevent a program wile run, the flow advances to step S62 wherein usual bootstrap processing is implemented.

As illustrated above, in the preferred embodiment, when an operator perform a predetermined operation while the computer unit is running, the system data is saved in a certain memory, no matter whether or not the resume mode is under way, with the main power supply to the computer unit getting turned off subsequently. When the main power supply is turned on thereafter, data processing is re-started from the point where the previous data processing was stopped. Therefore, according to the said preferred embodiment of the present invention, operator's erroneous practicing of a system operational step or procedure by accident is prevented from entailing the loss of system data and damage to the system hardware. Further with said preferred embodiment of this invention, following the preservation of system data, the main power supply is force-turned off, whereby the entirety of the system is assured of safety.

It is noted that the present invention is not limited to the above-quoted preferred embodiments. Commonly in these preferred embodiments, the power switch MSW is of the configuration to indicate a shift between the ON and OFF positions. This switch may however be of such a type to exhibit the ON or OFF condition of the power supply. In each of the above-cited preferred embodiments, the scope of forced resume processing is limited to three categories of the above-mentioned system operational steps. The present invention may have the scope of forced resume processing expanded to cover more system operational steps of different categories other than those specified in the foregoing. For example, with this invention it is practicable to provide such a system configuration wherein mounting an external memory to the computer unit main body or dismounting said memory therefrom while the main power supply is on may entail forced resume processing. In each of the above-quoted preferred embodiments of the present invention, two CPUs are used — one being a main CPU and the other a power supply controller CPU. The present invention is neither limited to such a system configuration but may be embodied in a computer system comprising one CPU. Further, the external appearance and the circuit configuration of the computer system in each of the above-cited preferred embodiments of the present invention do not undergo those defined in the preferred embodiments touched upon above but may be modified variously.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A computer system comprising:

a power switch;

power control means for supplying main power to said computer system when the power switch is on, and inhibiting the main power from being supplied to said computer system when the power switch is off;

a removable battery mounted on said computer system;

mode setting means for setting a resume mode in said computer system;

a data storage device;

first data saving means for saving system data necessary for resuming data processing by said computer system into said data storage device, when the power switch is off and the resume mode is set;

restoring means for restoring the system data saved in said data storage device;

mechanical latch means being set at one of a first position and a second position, for locking the removable battery to said computer system when the latch means is set at the first position, and for releasing a lock condition of said removable battery to said computer system when the latch means is set at the second position;

detector means for detecting said latch means being moved from the first position to the second position while the main power is supplied to the computer system; and second data saving means, in response to the detection by said detector means, for saving the system data into said storage device whether or not said resume mode is set.

2. A computer system according to claim 1, wherein said power control means includes means for inhibiting the main power from being supplied to said computer system after said first or said second data saying means save the system data into said data storage device.

3. The computer system according to claim 1, wherein said detector means outputs an interrupt signal indicating the detection, and said second saving means saves the system data in response to the interrupt signal.

4. A computer system comprising:

power switch;

power control means for supplying main power to said computer system when the power switch is on, and inhibiting the main power from being supplied to said computer system when said power switch is off;

mode setting means for setting a resume mode in said computer system;

a data storage device;

first data saving means for saving the system data necessary for resuming data processing by said computer system into said data storage device, when said power switch is off and the resume mode is set;

restoring means for restoring the system data saved in said data storage device;

a display device removably attached to said computer system;

mechanical latch means being set at one of a first position and a second position, for locking said display device to said computer system when said latch means is set at the first position, and for releasing a lock condition of said display device to said computer system when said latch means is set at the second position;

detector means for detecting said latch means being moved from the first position to the second position while the main power is supplied to said computer system; and second data saving means, in response to the detection by said detector means, for saving the system data into said data storage device whether or not said resume mode is set.

5. A computer system comprising:

a power switch;

power control means for supplying main power to said computer system when said power switch is on, and inhibiting the main power from being supplied to the computer system when said power switch is off;

mode setting means for setting a resume mode in said computer system;

a data storage device;

first data saving-means for saving system data necessary for resuming data processing by said computer system into said data storage device, when said power switch is off and the resume mode is set;

restoring means for restoring the system data saved in said data storage device;

a memory board removably attached to said computer system;

mechanical latch means being set at one of a first position and a second position, for locking said memory board to said computer system when said latch means is set at the first position, and for releasing a lock condition of said memory board to said computer system when said latch means is set at the second position;

detector means for detecting said latch means being moved from the first position to the second position while the main power is supplied to said computer system; and second data saving means, in response to the detection by said detector means, for saving the system data into said data storage device whether or not said resume mode is set.

6. A computer system comprising:

a data transfer bus;

a storage device coupled to said bus for storing data;

a removable device mounted on said computer system;

mechanical latch means being set at one of a first position and a second position, for locking said removable device;

a detector detecting said latch means being moved from the first position to the second position while the main power is supplied to said computer system;

mode setting means for setting a resume mode in said computer system; and data saving means for, in response to the detection by said detector, saving system data necessary for resuming data processing executed by said computer system, into said data storage device whether or not the resume mode is set.

7. A computer system according to claim 6, further comprising a power switch and a power supply circuit supplying a main power to said computer system when said power switch is on and inhibiting the main power from being supplied to said computer system when said power switch is off.

8. A computer system according to claim 6 wherein said data saving means saves the system data into said data storage device when the resume mode is set and said power switch is off.

9. A computer system according to claim 6, further comprising restoring means for restoring the system data saved into said data storage device to said computer system when said power switch is on.

10. A computer system according to claim 6, wherein said removable device includes a display device for displaying image.

11. A computer system according to claim 6, wherein said removable device includes a battery providing said power supply circuit with power.

12. A computer system according to claim 6, wherein said removable device includes a memory board for expanding memory of said computer system.

13. A method of saving and resuming system data on a computer system having a power switch, a power supply supplying a main power to said computer system when said power switch is on and inhibiting the main power from being supplied to said computer system when the power switch is off, a data storage device, a removable device attached to said computer system, mode setting means for setting a resume mode in said computer system, and mechanical latch means for locking said removable device to said computer system and releasing the lock condition of said removable device to said computer system, the latch means being set at one of a first position for locking the removable device to said computer system and a second position for releasing the lock condition, said method comprising the steps of:

detecting said latch means being moved from the first position to the second position while the power supply supplies the main power to said computer system;

saving system data into said data storage device in response to the detection in said latch means detecting step whether or not said resume mode is set;

detecting said power switch is on;

checking whether or not system data is saved into said data storage device in response to the detection in said switch detecting step; and restoring the system data saved into said data storage device to said computer system when the system data is saved into said data storage device.

* * * * *